April 4, 1950     F. C. HALEY     2,502,720
WATERING FOUNT
Filed July 7, 1948     2 Sheets-Sheet 1
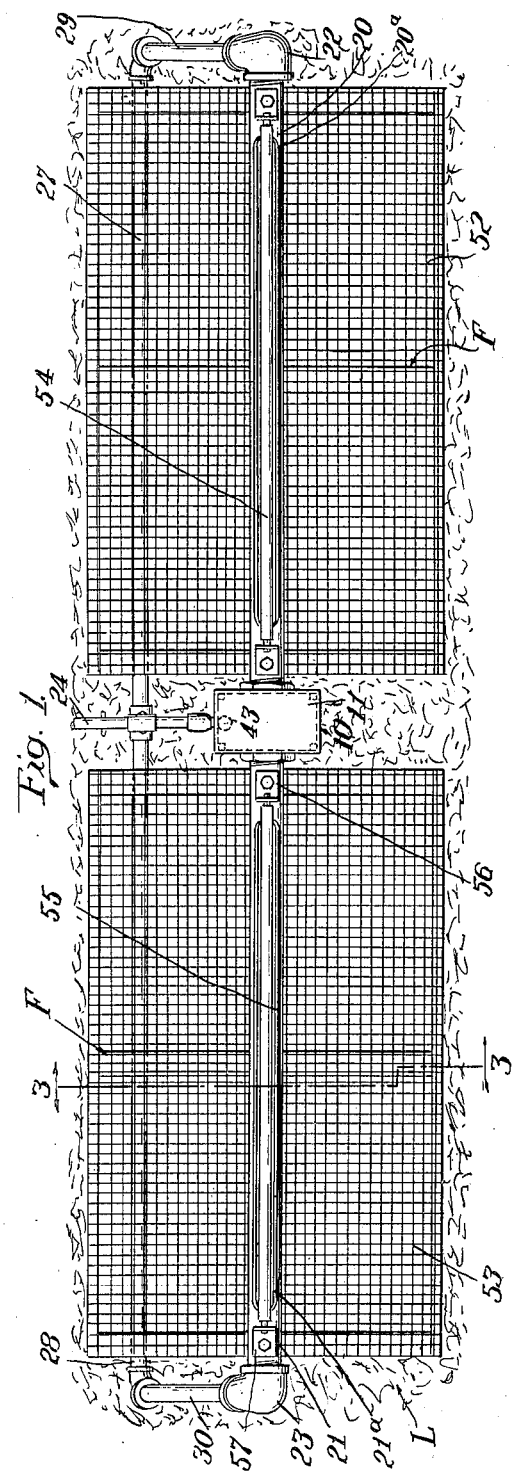
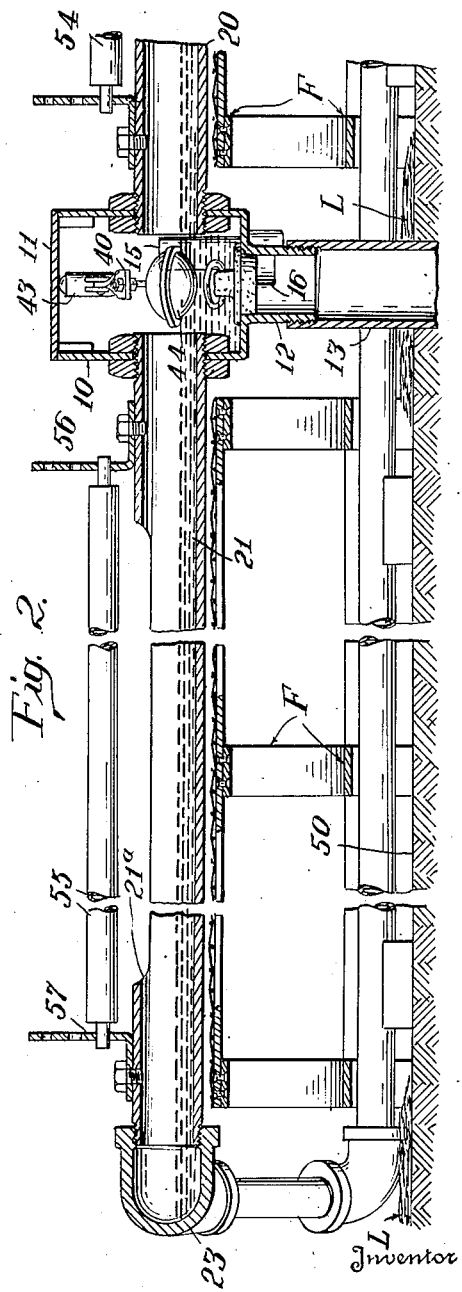
Inventor
Fred C. Haley
By Watson, Cole, Grindle & Watson,
ATTORNEYS

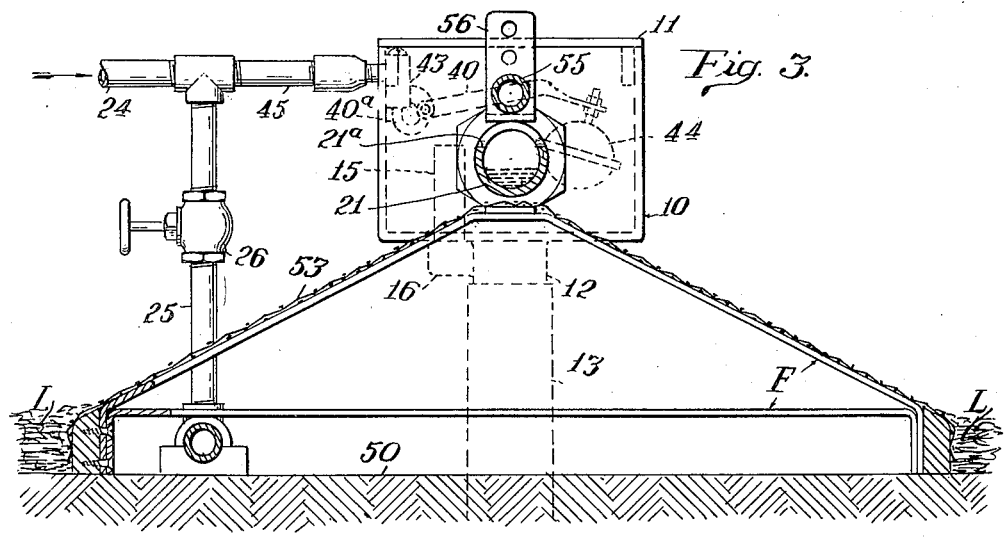
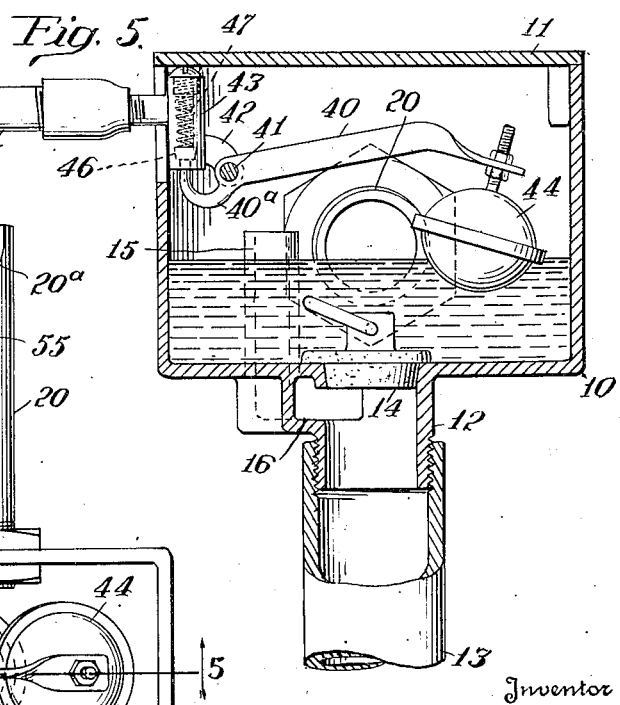
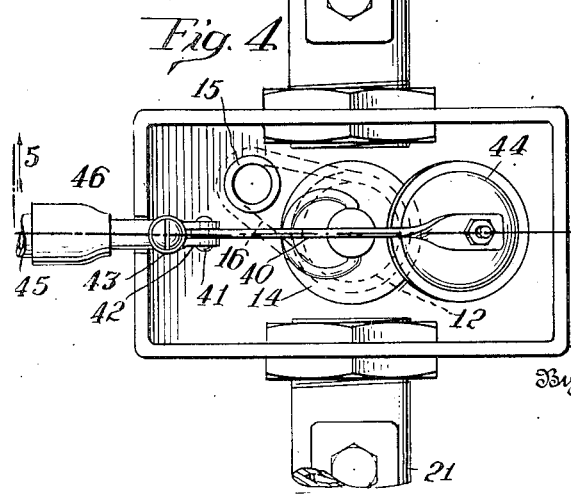

Patented Apr. 4, 1950

2,502,720

UNITED STATES PATENT OFFICE 2,502,720

WATERING FOUNT

Fred C. Haley, Canton, Ga.

Application July 7, 1948, Serial No. 37,469

2 Claims. (Cl. 119—74)

This invention relates to watering founts and particularly to watering founts of the automatic type designed and intended to be used by those engaged in raising chickens on a commercial scale, although adaptable for use for other purposes when and if desired.

It is well known by those engaged in raising poultry for market that the mortality rate among freshly hatched chickens will be high unless the greatest care is exercised in providing them with necessary food and water during the first few days of their lives, and that only a slightly less degree of care is required thereafter, up until the time that the chickens have reached the desired size. Where chickens are raised upon a large scale the feeding and watering mechanisms utilized should, of course, be of automatically operating nature as otherwise the labor costs will be unduly high. Many attempts have heretofore been made to provide watering founts of the automatic type which are of such character as to maintain at all times, immediately available, a supply of cool, fresh water, so necessary to the health of the growing chicken, while at the same time safeguarding the health of the chicken by reducing to a minimum the possibility that the floor, or the litter scattered on the floor, of the chicken house in which the fount is located shall become wet. Young chickens whose feet or feathers become wet or damp become immediately vulnerable to attack by one or another of several diseases and the degree of success of any poultry raiser is largely determined by his success in minimizing the percentage of loss which he experiences as a result of this single cause.

In accordance with the present invention a novel and improved automatically operating fount is provided the actual drinking receptacles of which comprise elongated tubular members of small cross section, preferably fabricated of metal, the upper portion of each of these members being cut away to render accessible an elongated, narrow, shallow body of water, of such depth as to permit a drinking chicken to immerse its beak. The surface of each such body of water is maintained automatically at a predetermined level, the position of this level being precisely controlled by mechanism of adjustable nature so that it may be raised for older chickens and lowered for younger chickens.

The water which enters the tubular drinking vessels or troughs issues from a central or intermediate reservoir which is of such character and dimension, and is so located, that the float member of an automatic water level control device has at all times an adequate body of water in which to operate, whether the body of water in each of the drinking troughs be shallow or deep.

It is well known to those engaged in the poultry industry that drinking founts should not only be of such character as to eliminate insofar as possible the scattering of water by drinking chickens but that it must have the ability to be readily cleansed or washed since each chicken which drinks has more or less matter clinging to its bill, which matter is washed off during the drinking operation and is deposited on the bottom of the drinking troughs. The drinking fountain of the present invention is particularly adapted to be washed or cleansed at frequent intervals and in minimum time. Each of the elongated drinking troughs has connected to its outer end the discharge end of a water supply pipe or conduit, and the central reservoir described, to which the troughs are connected, not only comprises a fresh water reservoir but likewise a cleansing water receiving means, a port, normally closed by a valve, formed in the bottom of the central reservoir being at the lowest point in the system and comprising a drainage port. When it is desired to clean the water troughs by flushing them with clean water the float will be lifted manually so that the inlet valve will close, and the valve will be removed from the port in the bottom of the reservoir whereupon the water contained in the reservoir will pass rapidly downwardly therefrom into a drain pipe, followed immediately by the water normally contained in the drinking troughs. Upon the opening of a valve wash water is discharged into the outer end of each drinking trough at a sufficient velocity or under sufficient pressure to cause a stream of cleansing water to pass rapidly entirely through the trough from end to end, each such stream ultimately reaching the central reservoir, which is then functioning as a collection chamber for the wash water. The operation of draining the reservoir and drinking troughs, and washing these troughs, occupies only a few seconds and the time of an attendant is greatly conserved for this reason. The washing, accomplished by the rapidly flowing streams, is thoroughly effective and, after it has been concluded, the troughs are quite clean. This results in large part by reason of the restricted cross section of the trough, the stream of wash water being mostly confined to a narrow channel so that it will accomplish a scouring operation.

Various embodiments of the invention may be constructed to meet varying circumstances and conditions and one form, which has been found to be particularly suitable for use in the raising of young chickens, is illustrated in the accompanying drawings, in which, Figure 1 is a top plan view of the entire drinking fount;

Figure 2 is a longitudinal vertical section through portion of the apparatus, upon a larger scale in order that details may be more clearly shown;

Figure 3 is a section on line 3—3 of Figure 1;

Figure 4 is a top plan view of the central reservoir of the apparatus, showing adjacent portions of the attached drinking troughs; and Figure 5 is a section on line 5—5 of Figure 4.

The central reservoir of the apparatus is indicated at 10 and, in the form of the invention selected for disclosure by way of example, comprises a box like member fabricated of light metal, for instance aluminum, the reservoir being rectangular in horizontal and vertical section and the top being normally closed by means of a removable lid 11. A tubular projection integral with the bottom of the reservoir 10 and extending downwardly therefrom, is indicated at 12, the outer surface of the lower end of the tubular projection 12 being threaded to facilitate connection with the upper end of a drain pipe 13. A stopper or valve 14 normally closes the upper end of the discharge tube 12 but this valve may be easily removed by the operator upon the lifting of cover 10 to permit the liquid content of the reservoir 10 to pass down into the drain 13. An overflow tube is indicated at 15, this tube being preferably cast as an integral portion of the reservoir 10 and extending from a level approximately midway between the bottom and top of the reservoir downwardly through the floor of the reservoir and then laterally to a discharge port 16 formed in the side wall of the tubular extension 12. If for any reason the level of the body of water in the reservoir 10 should rise above the top of the overflow 15 while the valve 14 is positioned as shown in Figure 5, water will flow downwardly into the drain and, by reason of the provision of this overflow means, accidental flooding of the troughs and the wetting of the floor of the chicken house is prevented.

To the reservoir 10 the aligned tubular trough members 20 and 21 are connected, these members being tubular as shown, preferably disposed in axial alignment, and horizontally arranged. The inner end of each opens into the reservoir 10, as clearly shown in Figures 2 and 5, and each normally contains an elongated body of water, extending from end to end thereof, having a constant depth which is determined by an automatic float controlled water supply means to be described. To the outer end of each of the trough members 20 and 21 is secured an elbow, these elbows being indicated at 22 and 23 respectively, and the elbows are connected with a water main indicated at 24 by means of the vertical pipe 25, having a control valve 26 intermediate its ends, the horizontal pipes 27 and 28 extending horizontally, in opposite directions, from pipe 25, and the upwardly inclined connecting pipes or ducts 29 and 30. It will be observed that, when the valve 26 is open, water may flow from the supply main 24 through the connecting conduits described to the elbows 22 and 23 and thus into the drinking trough members 20 and 21, at the outer ends thereof.

The upper portions of the drinking trough members 20 and 21 are cut away, as at 20a and 21a, to permit chickens to drink by inserting their bills into the trough and the elongated openings 20a and 21a are sufficiently wide to permit chickens of all sizes to drink. In cross section, however, the drinking trough is of small size and the inner surfaces are smooth so that wash water flowing at high velocity along its inner surface when the valve 26 is open will thoroughly clean or scour such inner surfaces and move any sediment contained therein into the reservoir 10 so that this ultimately passes down the drain 13, the valve 14 always being open during the flushing operation.

Water for drinking purposes is automatically supplied from time to time as needed, the depth of the water in the reservoir 10 being controlled by an automatic valve actuating means which includes the lever 40, one end of which is pivotally mounted at 41 upon a bracket 42 extending laterally from a valve casing 43, the opposite end of the lever 40 having adjustably mounted thereon a float 44 which is normally partially immersed in the body of water contained in the bottom of the reservoir 10. The valve casing 43 is rigidly mounted upon the end of a pipe or conduit 45 which is in open communication with the supply main 24. A valve such as indicated rather diagrammatically at 46, and which may be normally maintained seated by a spring such as indicated at 47, is adapted to be raised from its seat by means of a finger 40a integral with lever 40, when the float 44 is elevated by inflowing water to a predetermined level. When this level is reached the end of finger 40a will disengage valve 46 and the valve will be fully seated, thus interrupting the inflow of water. The position of the float 44 relatively to the end of the lever 40 upon which it is mounted may be readily adjusted and hence the level of the body of water in the reservoir 10 regulated to suit conditions, the water level in each of the troughs 20 and 21 being at all times the same as the water level in the reservoir 10.

It will, of course, be understood that, when the troughs 20 and 21 are to be cleaned or flushed, the lid 11 of the reservoir 10 will be lifted, the stopper 14 removed, the float 44 lifted so as to ensure closing of valve 46, and valve 26 opened for such period of time as may be necessary to ensure thorough cleaning of the trough. Valve 26 is then closed and the float 44 lowered into operative position, whereupon the reservoir and troughs will be again filled with fresh clean water to the level determined by the position of the float 44 and the apparatus is again ready to be used.

Preferably the elongated drinking troughs 20 and 21 are supported at a substantial distance above the level of the floor of the chicken house, which floor is indicated at 50, and preferably also at a substantial distance above the level of the bodies of litter, generally indicated at L, which are normally maintained upon the floor of a chicken house. This may be accomplished by providing, beneath each trough, a frame, generally indicated at F, which supports upwardly and inwardly inclined foraminous members or nettings 52 and 53, respectively, over which the chickens may walk and which will not retain or support any droplets of water which may happen to fall from the beak of a chicken who has recently drunk. A bar or rod is positioned directly above each aperture 20a and 21a to prevent any chicken from stepping into the drinking trough, these bars being indicated at 54 and 55, respectively, each having its ends rotatably supported in brackets, one pair of brackets being indicated at 56 and 57. In order to permit vertical adjustment of the position of each bar or rod thus provided each such supporting bracket is provided with a plurality of vertically aligned apertures in which the reduced end of the bar may be inserted. For larger chickens the bars will be elevated and for smaller chickens they will be lowered. Preferably the bars are rotatably mounted in the brackets at their ends so that any chicken which might happen to step on such bar will be thrown off.

From the foregoing description it is believed that the construction and operation of the watering fount will be fully understood. It will be appreciated by those skilled in the art that minor changes may be made to adapt the fount to fowls of different kinds and sizes.

Having thus described the invention, what is claimed as new and desired to be secured by Letters Patent is:

1. A watering fount comprising an elongated trough, a chamber fixed immediately adjacent one end of said trough and in open communication with said trough, the bottom of said chamber being below the bottom of said trough and having a drainage port therein, a valve removably positioned in said drainage port for controlling the flow of water through said drainage port, a valve controlled conduit permanently connected to said trough at the end removed from said chamber for selectively directing a stream of flushing water axially into the said trough, a second conduit connected to said chamber for introducing water into said chamber, a float valve means supported in said chamber and operatively associated with said second conduit for maintaining the level of the surface of the water introduced through said second conduit at a predetermined point when said drainage port is closed and said stream directing means is inactive, said float valve means being adapted to interrupt the flow of water into said chamber when said stream directing means is active.

2. The combination set forth in claim 1 in which the trough comprises a tube the upper portion of which is cut away.

FRED C. HALEY.

REFERENCES CITED

The following references are of record in the file of this patent:

UNITED STATES PATENTS

| Number | Name | Date |
|---|---|---|
| 499,797 | Mundy | June 20, 1893 |
| 529,547 | Eberley | Nov. 20, 1894 |
| 811,914 | Gillenwaters | Feb. 6, 1906 |
| 1,646,245 | Hawkins | Oct. 18, 1927 |
| 2,292,020 | Venolia | Aug. 4, 1942 |

FOREIGN PATENTS

| Number | Country | Date |
|---|---|---|
| 716,611 | France | Oct. 12, 1931 |